2,852,969

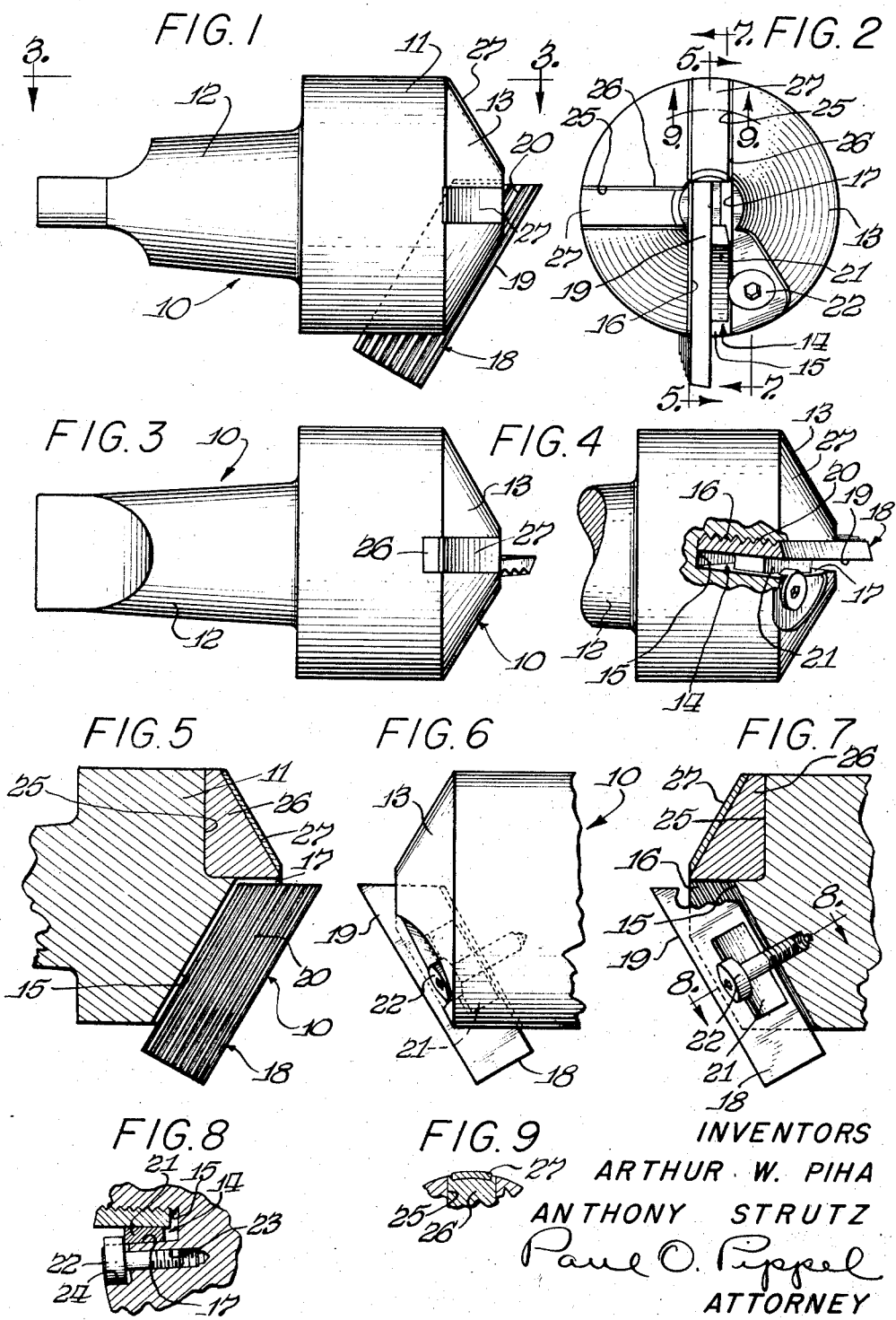

ADJUSTABLE SINGLE BLADE CHAMFERING TOOL

Arthur W. Piha, Riverside, and Anthony Strutz, River Grove, Ill., assignors to International Harvester Company, a corporation of New Jersey Application August 23, 1955, Serial No. 530,002

1 Claim. (Cl. 77—73.5)

This invention relates to a tool adapted to be used for providing a chamfer or countersink around the open end of a bore.

It is a prime object of this invention to provide an improved chamfering tool which in use will produce a smooth and finished chamfer at the open end of a bore.

Still another object of this invention is to provide an improved chamfering tool which eliminates tool chatter and other resultant vibrations normally encountered with conventional chamfering devices.

A still further object is to provide a cutting tool of the countersink or chamfering type, the said tool being readily adapted for machining different materials with satisfactory results and with the elimination of excessive vibrations resulting from conventional devices.

A still further object of the invention is to provide a chamfering tool which is self-aligning in the bore which is to be chamfered, the tool including inserts having wear strips or guides adapted to pilot the tool in the bore during operation.

Still another object of the invention is to provide an improved chamfering tool, the tool having a single cutting blade which is adapted to be moved to a plurality of settings, thereby providing a new cutting edge without removal or resharpening of the blade thus insuring long life and inexpensive operation.

A still other object is the provision of an improved chamfering tool having a removable cutting blade, the said blade being readily replaceable when worn out, thus saving the blade holding portion of the tool for further use.

These and further objects will become readily apparent from a reading of the specification when examined in connection with the accompanying sheet of drawing.

In the drawing:

Figure 1 is a side elevational view of an improved single blade chamfering tool;

Figure 2 is a front elevational view of the chamfering tool shown in Figure 1;

Figure 3 is a plan view of an improved chamfering tool;

Figure 4 is a view, partially in section, of the body of a chamfering tool also showing the disposition of an adjustable blade with respect to said body;

Figure 5 is a cross sectional view taken substantially along the line 5—5 of Figure 2;

Figure 6 is a side elevational view of a portion of the body of a chamfering tool, the said view disclosing an adjustable cutting blade and means for securing the same in position;

Figure 7 is a cross sectional view taken substantially along the line 7—7 of Figure 2;

Figure 8 is a cross sectional view, taken along the line 8—8 of Figure 7, showing a fastening device for securing a cutting blade; and Figure 9 is a fragmentary view of a pilot insert, the said view being taken substantially along the line 9—9 of Figure 2.

Referring to the figures, a chamfering tool is designated by the reference character 10. A chamfering tool 10 comprises a body 11 having at one end a shank 12 adapted to be inserted in a conventional type of drill press or other machine tool (not shown). The other end of the body 11 is provided with a frusto-conical portion 13 having a slot 14. The slot 14 opens outwardly of the frusto-conical portion 13 and includes a bottom wall 15 having generally the same slope or incline as the surface of the frusto-conical portion 13. The slot 14 further includes a serrated side wall 16 and a sloping side wall 17. A cutting blade 18 is disposed in the slot 14, the said cutting blade being generally designated by the reference character 18.

The cutting blade 18 comprises a cutting edge or surface 19, one side of said blade 18 being provided with serrations 20 which conform with the serrated side wall 16 as best shown in Figure 4. Thus the blade 18 may move transversely or radially with respect to the axis of the tool 10. The cutting blade is adapted to be placed or locked in position by means of a wedge 21, best shown in Figure 8, which is securely wedged in position by means of a set screw 22 disposed in a threaded bore 23. An enlargement 24 of the bore 23 accommodates the head of the set screw 22.

The frusto-conical portion 14 and the body 11 are further provided with a plurality of circumferentially spaced recesses 25 as best shown in Figures 2, 5 and 7. The recesses 25 have positioned therein pilot inserts 26 which may be secured in said recesses 25 by brazing or other suitable processes. The pilot inserts 26 are provided with wearing surfaces or strips 27 which may be made of suitable hardened strips. As best shown in Figures 5 and 7 the wearing surfaces 27 comprise carbide strips which may be suitably brazed to the inserts 26. The strips or surfaces 27 project outwardly with respect to the frusto-conical surface or portion 13.

In use the tool has its shank 12 suitably secured in the adapter or chuck of a drill press, lathe, or similar machining device, the shank 12 can be tapered or straight for universal adoption (not shown). An article having a bore to be chamfered is placed into engagement with the conical portion 13, the said tool 10 being under rotation. The pilot surfaces 27 engage the material adjacent the open end of the bore and the blade 18 has its cutting surface 19 begin the chamfering operation. The wear strips 27 suitably support the blade 19 in position and chattering of the tool is prevented by virtue of the positive guiding action of the wearing surfaces 27. Since these wearing surfaces are made of carbide or similar hardened material, replacement of the same, due to wear, is very infrequent. By unloosening the set screw 22 with respect to the wedge 21 the blade 18 may be easily moved radially or laterally with respect to the axis of the tool to present a new wearing surface if a portion of the cutting edge 19 becomes dulled. Thus the blade 18 may be moved to a number of positions and by simply tightening the set screw 20 the blade is securely positioned. The serrations of course are effective to securely mount the tool in any of the locked or adjusted positions.

Thus the wearing strips 27, or pilot, are effective to securely support the single blade chamfering tool without excessive vibration chatter. Therefore a clean and smooth chamfering edge is provided. The tool may have its cutting blade easily removed and replaced whenever necessary and the multiple sharpened edges afforded by the adjustment of the blade leads to long life and inexpensive maintenance.

Thus the objects of the invention have been fully achieved and an improved chamfering tool has been disclosed. It must be understood that various modifications may be made without departing from the spirit of the invention as disclosed nor from the scope thereof as defined in the appended claim.

What is claimed is:

A chamfering tool comprising a cylindrical body having a shank at one end and a frusto-conical portion at an opposite end, said body having a slot including a bottom wall parallel to said frusto-conical portion and laterally spaced side walls, one of said walls being inclined relative to the other, said first slot opening outwardly of said frusto-conical portion, a plurality of serrations on one of said side walls, said serrations extending substantially parallel to said bottom wall and to said frusto-conical portion, a single cutting blade disposed in said slot, said cutting blade including an outer cutting edge, said blade having a plurality of serrations conforming to the serrations of said side wall, means adjustably securing said blade in said first slot whereby said blade may be radially adjusted relative to the axis of said tool comprising, a wedge element disposed between said blade and one of said side walls, means locking said wedge in said first slot, second and third slots in said body, said second and third slots being circumferentially spaced relative to each other and to said first slot and opening outwardly of said frusto-conical portion, and inserts secured in said second and third slots, said inserts having hardened wearing strips projecting outwardly from said frusto-conical portions and being adapted to engage adjacent edges of a bore to be chamfered thereby piloting said tool.

References Cited in the file of this patent

UNITED STATES PATENTS

| | | |
|---|---|---|
| 1,166,716 | Riley et al. | Jan. 4, 1916 |
| 1,346,105 | Bosse | July 13, 1920 |
| 1,923,177 | Tucker | Aug. 22, 1933 |
| 2,097,898 | Severson | Nov. 2, 1937 |
| 2,418,021 | Fleischer | Mar. 25, 1947 |